March 25, 1924.
C. A. SCHELL
1,488,291
CENTERING DEVICE FOR FLEXIBLE COUPLINGS
Filed Oct. 28, 1920
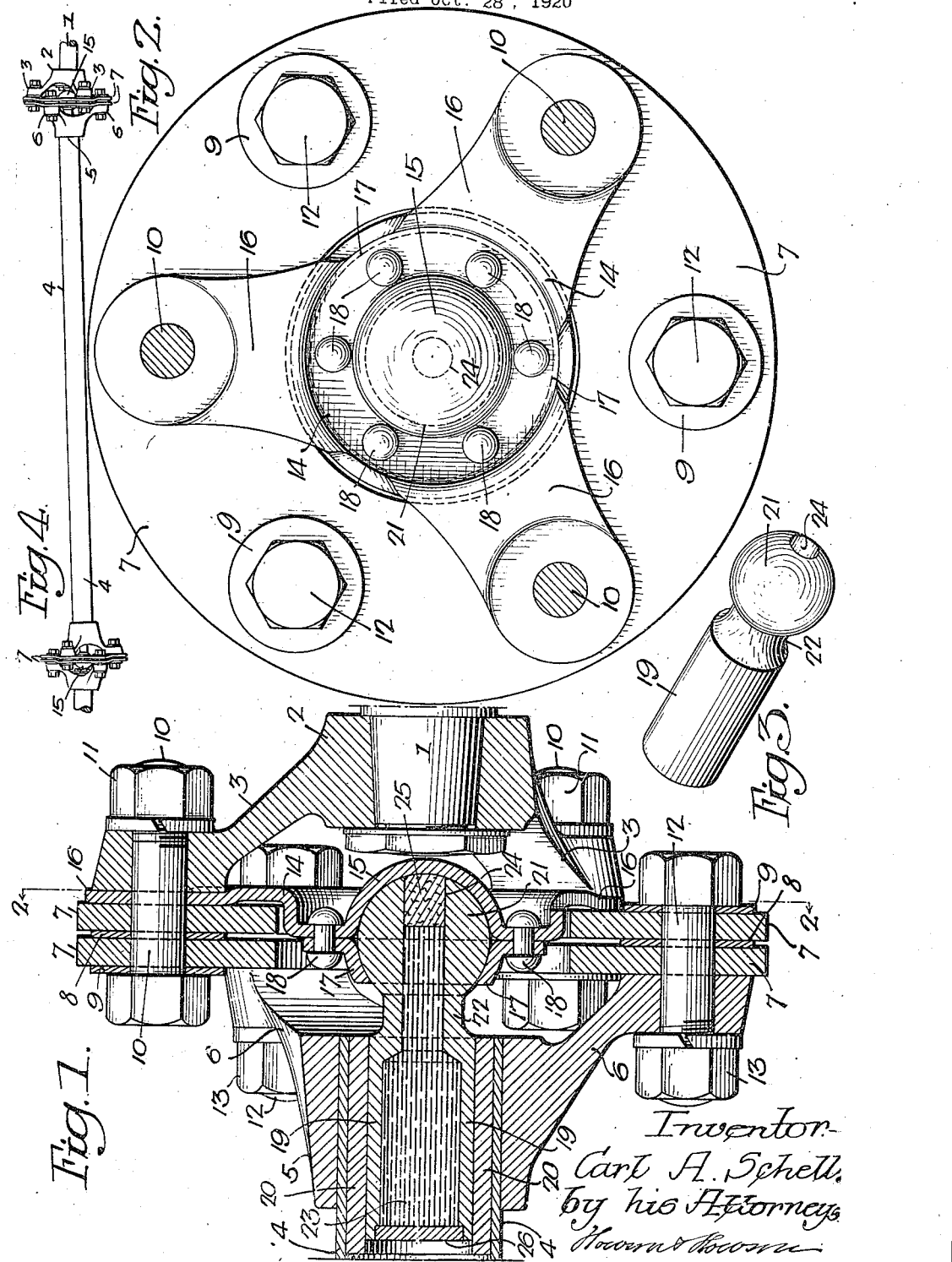

Patented Mar. 25, 1924.

1,488,291

UNITED STATES PATENT OFFICE.

CARL A. SCHELL, OF CLEVELAND, OHIO, ASSIGNOR TO THERMOID RUBBER COMPANY, OF HAMILTON TOWNSHIP, NEW JERSEY, A CORPORATION OF NEW JERSEY.

CENTERING DEVICE FOR FLEXIBLE COUPLINGS.

Application filed October 28, 1920. Serial No. 420,107.

*To all whom it may concern:*

Be it known that I, CARL A. SCHELL, a citizen of the United States, residing in Cleveland, Ohio, have invented certain Improvements in Centering Devices for Flexible Couplings, of which the following is a specification.

My invention relates to certain improvements in flexible couplings used in connecting a driving shaft with a driven shaft and is especially adapted for couplings used in connection with automobiles where there must be a certain flexibility in the connection between a driving and a driven member.

Furthermore, my invention relates to certain improvements in flexible couplings known as "disk couplings," in which flexible disks are connected to spiders on hubs, one of which is mounted on a driven member and the other on a driving member.

One object of my invention is to provide means for centering the two shafts, while allowing them to have the desired flexibility necessary in this type of coupling, and a further object is to so construct the couplings that the driving shaft and the assembled parts can be taken apart without moving the axle or transmission of an automobile.

In the accompanying drawings:

Fig. 1 is a longitudinal sectional view through a coupling illustrating my invention;

Fig. 2 is a sectional view on line 2—2, Fig. 1;

Fig. 3 is a detached perspective view, illustrating a portion of the centering device; and Fig. 4 is a side view showing a driving shaft coupled to a transmission shaft and to a shaft geared to an axle.

In the present instance, 1 is a portion of the transmission shaft of an automobile on which is the hub 2 having arms 3. 4 is a driving shaft connecting the transmission shaft with the axle. This driving shaft is hollow, in the present instance, and secured to a hub 5 having arms 6. 7—7 are two flexible disks, preferably made of rubber and fabric. 8 are washers located between the disks. 9 are washers on the outside of the disks. 10 are bolts extending through the arms 3 and through holes in the disks 7 and washers 8 and 9, and provided with nuts 11. 12 are bolts extending through the arms 6, the disks 7, and the washers 8 and 9. These bolts 12 have nuts 13. The above is the ordinary construction of a flexible coupling using disks. In many cases, the shafts are out of line and have a tendency to whip when driven at a high speed. The object of my invention is to center the driving shaft in respect to the other shafts so that, while the couplings can be flexed, the driving shaft will remain in a central position avoiding any whipping action.

14 is a struck up sheet metal plate having a half socket 15 and having three arms 16 corresponding to the arms of the hub 2. These arms are perforated for the passage of the bolts 10 so that the half socket 15 is held rigidly in a central position in respect to the driving shaft 1 when the nuts are tightened on the bolts. 17 is an annular cap shaped to form a continuation of the half socket 15. This cap is secured to the plate 14 by rivets 18, or other fastenings.

19 is a plunger mounted in a bushing 20 driven in the end of the hollow shaft 4, as shown in Fig. 1. On the end of this plunger 19 is a ball 21, which snugly fits the socket 15 formed by the plate 14 and the cap 17. The ball is connected to the plunger by a reduced neck 22 and the opening in the cap is of sufficient diameter to allow the ball to move freely in the socket. As the plunger is free to move longitudinally in the bushing 20 when the coupling is flexed, it will be seen that while this device centers the two shafts it does not interfere with the flexibility of the coupling.

In order to lubricate the ball and the socket, I make the plunger and ball hollow, as shown in Fig. 1, so as to form a reservoir 23 for lubricant. The rear end of this reservoir is closed by a cap 26. A reduced passage 24 from this reservoir extends to the extreme end of the ball, as shown in Fig. 3, and a plug 25 of felt, or other suitable porous material, is placed in this reduced passage so that the lubricant will saturate the felt and as the felt is in contact with the wall of the socket it keeps it constantly lubricated.

When my invention is used to center the driving shaft of an automobile in respect to the transmission shaft and axle, the driving shaft with its spiders, disks and socket plate, can be removed from the automobile and replaced without dismantling the transmission or axle and, if found necessary, one or both of the socket plates can be moved with the ball and plunger towards the driving shaft to a certain extent to allow the parts to be removed or replaced as a whole.

I claim:—

1. The combination in a flexible coupling, of a driving and a driven shaft; a hub mounted on each shaft, each hub having arms; a disk secured to the arms of the two hubs and forming a flexible coupling between the two shafts, one of said shafts being hollow; a bushing located within the shaft; a plunger mounted in the bushing and having a ball at its outer end located in a central position in respect to the two shafts; a plate having a half socket in which the ball is mounted and having arms extending in a line with the arms of one of the hubs; bolts securing the disks to said arms, said bolts passing through openings in the arms of the plate; and a cap secured to the plate and forming a continuation of the socket.

2. The combination in a flexible coupling, of a driving and a driven shaft, one of the shafts being hollow; a flexible connection between the two shafts; a plate having a centrally located socket the plate being mounted between the two shafts and held rigidly to one of the shafts; a plunger mounted in the other shaft and having a head adapted to the socket, said plunger being hollow to form a receptacle for lubricant and having a passage extending through the ball; and a plug of porous material mounted in the end of the passage and forming a means for supplying lubricant to the space between the ball and the socket.

3. The combination in a flexible coupling, of a driving shaft and a driven shaft; a hub on each shaft having arms; a flexible disk; bolts securing the disk to the arms and coupling the hubs; a socket plate secured to the arms of one hub; a ball mounted in the socket plate; and means for retaining the ball in the socket, said ball having a plunger arranged to slide in the shaft on which the other hub is mounted so that the socket plate and ball can be moved towards the last mentioned shaft to allow for the withdrawal of the coupling when the bolts are removed.

4. The combination in a flexible coupling, of a driving shaft; two shafts at each end of the driving shaft; hubs on the shafts; a flexible disk coupling each end of the driving shaft to other shafts; a socket plate; a ball adapted to the plate; a plunger mounted in each end of the driving shaft and carrying a ball; and means for holding the ball in the socket, the parts being so arranged that the two plates and plungers can be moved longitudinally toward the driving shaft to allow the shaft to be withdrawn and replaced without disturbing the other shafts.

CARL A. SCHELL.